Dec. 21, 1965  A. E. KIRALFY  3,224,103
HEIGHT GAUGE

Filed Aug. 26, 1963  3 Sheets-Sheet 1

INVENTOR.
ALEXANDER E. KIRALFY
BY Robert C. Comstock
ATTORNEY

Dec. 21, 1965     A. E. KIRALFY     3,224,103
HEIGHT GAUGE

Filed Aug. 26, 1963     3 Sheets-Sheet 2

INVENTOR.
ALEXANDER E. KIRALFY
BY *Robert C. Comstock*
ATTORNEY

Dec. 21, 1965  A. E. KIRALFY  3,224,103
HEIGHT GAUGE

Filed Aug. 26, 1963  3 Sheets-Sheet 3

INVENTOR.
ALEXANDER E. KIRALFY
BY Robert C. Comstock
ATTORNEY

United States Patent Office 3,224,103
Patented Dec. 21, 1965

3,224,103
HEIGHT GAUGE
Alexander E. Kiralfy, 823 Wellesley Ave.,
Los Angeles, Calif.
Filed Aug. 26, 1963, Ser. No. 304,517
13 Claims. (Cl. 33—172)

This invention relates to a precision height gauge.

It is an object of my invention to provide such a height gauge which is quicker and easier to operate and which is more accurate than conventional height gauges which are now in use.

It is a more particular object of my invention to provide a height gauge which utilizes a dial reading, rather than a conventional vernier reading, for greater speed and accuracy.

Another object of my invention is to provide a height gauge which does not require the use of a machinist dial indicator and which is equal to, or superior in accuracy to, a conventional height gauge used in combination with a machinist dial indicator.

It is a more particular object of my invention to provide a precision height gauge in which the measuring member moves downwardly and rests by the force of gravity only upon the object being measured, thus eliminating errors, uncertainties and delays, which are inherently present in the operation of a conventional height gauge.

It is a related object of my invention to provide a height gauge in which greater accuracy is provided through the elimination of all backlash in the operating mechanism.

A further object of the invention is to provide a height gauge of greater speed and accuracy which can be used to make depth readings; to find and measure the center of a hole; to measure parts which are mounted on accurate blocks or parallel bars and on blocks or parallel bars which may have been re-worked and are not of a precise dimension, in which case the dial is adjusted so that direct readings are still made; and which can also be used to read the run-out of a shaft.

Yet another object of the invention is to provide a height gauge which is simpler to operate, thus permitting its use by operators of lesser skill and training, and in which the accuracy of the measurements is not affected by variations in operating techniques.

Another object of the invention is to provide a height gauge which is faster to operate and more accurate because it eliminates lengthy gears and gear operations by providing precision coarse settings in combination with precision fine measuring between the coarse settings.

My invention also comprises such other objects, advantages and capabilities as will later more fully appear, and which are inherently possessed by my invention.

While I have shown in the accompanying drawings a preferred embodiment of my invention, it should be understood that the same is susceptible of modification and change, without departing from the spirit of my invention.

Referring to the drawings.

Figures 1, 7, 8:
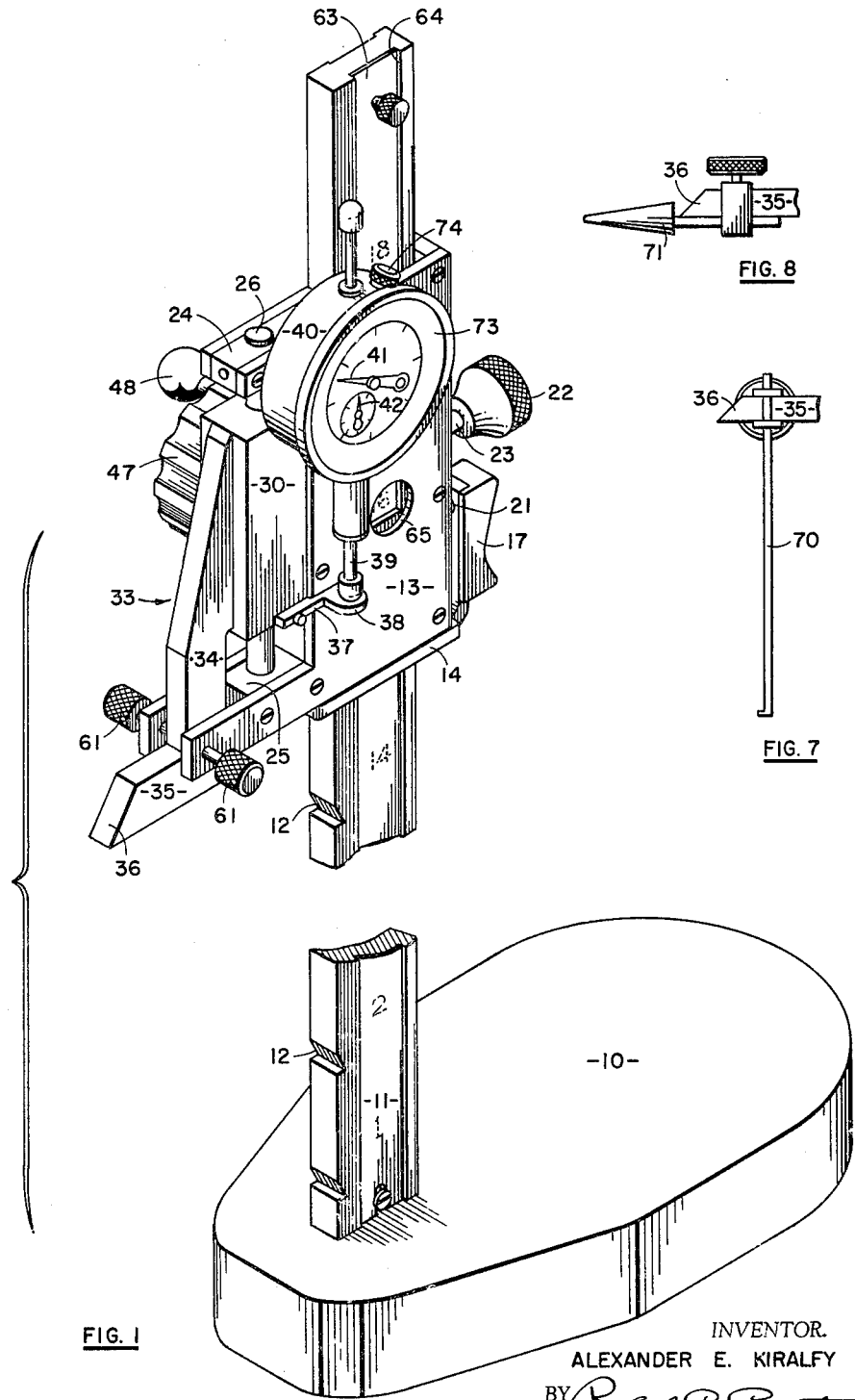
FIG. 1 is a perspective view of my height gauge, broken to omit a portion of the post.
FIG. 7 is a fragmentary side elevational view showing the attachment of a conical member to the end of the measuring member for locating and measuring the center of a circular opening.
FIG. 8 is a fragmentary side elevational view, showing the attachment of a rod to the end of the measuring member for measuring depth instead of height.
Figure 2:
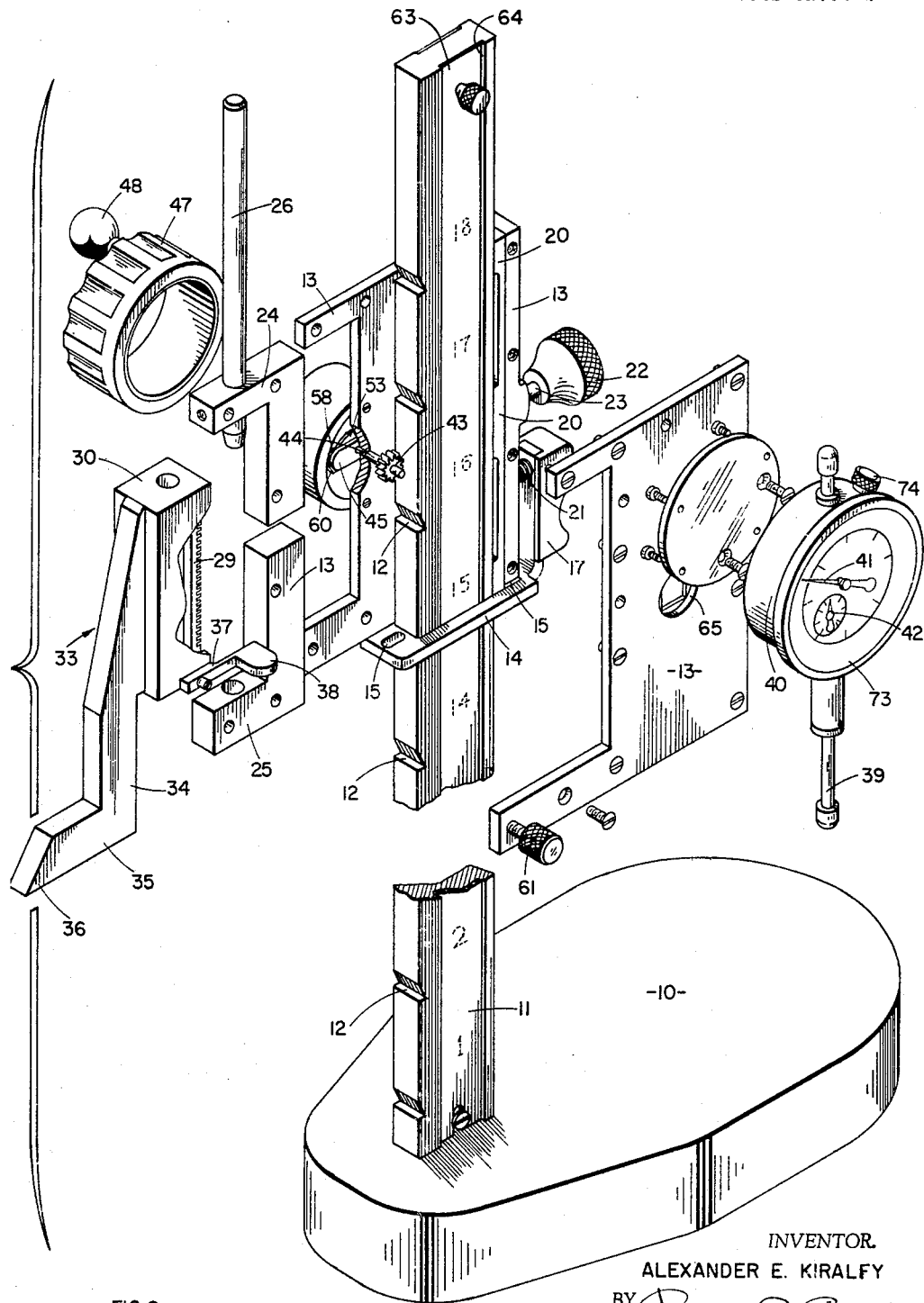
FIG. 2 is an exploded perspective view of my height gauge.
Figures 3, 4:
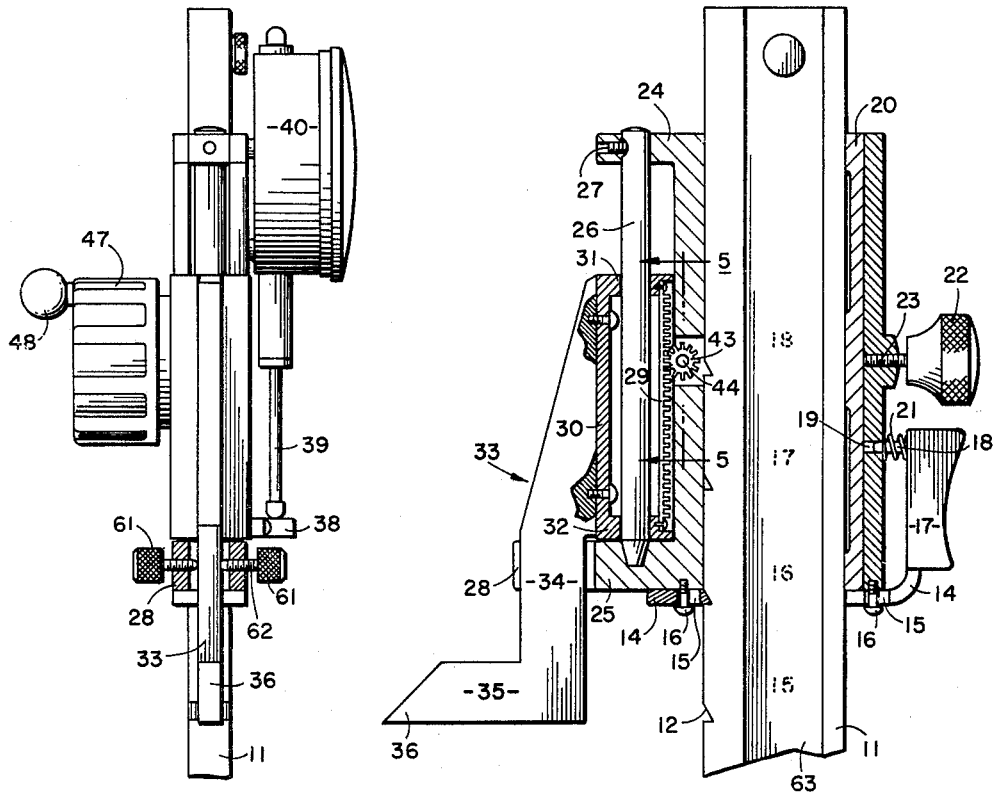
FIG. 3 is a longitudinal sectional view of the carriage and frame assembly.
FIG. 4 is a side elevational view of the carriage and frame assembly.
Figure 5:
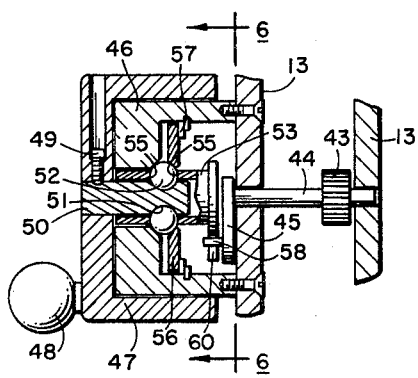
FIG. 5 is a longitudinal sectional view of the drive mechanism, taken substantially along line 5—5 of FIG. 3.
Figure 6:
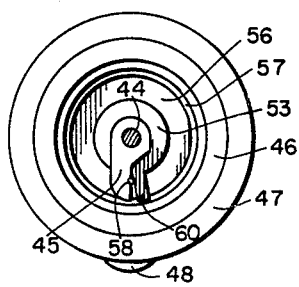
FIG. 6 is a longitudinal sectional view of the drive mechanism, taken substantially along line 6—6 of FIG. 5.

A preferred embodiment which has been selected to illustrate my invention comprises a substantially heavy or firm horizontal base 10. Extending vertically upwardly from the base 10 is a post 11. Spaced along one side edge of the post 11 are a plurality of inwardly cut notches 12. Each of the notches 12 has a horizontal base portion and an angularly directed upper portion. The notches 12 are ordinarily preferably spaced one inch apart, although other spacing may be used for the metric system or for specialized purposes.

The sliding carriage 13 is mounted for vertical sliding movement along the post 11. Mounted on the bottom of the carriage 13 is an elongated bar 14, which has on its horizontal portion a pair of longitudinal slots 15, which are disposed on opposite sides of the post 11. A pair of screws 16 or the like extend through the slots 15 into the bottom of the carriage 13. The bar 14 also has a vertically directed portion which extends along the side edge of the post 11 opposite from the notches 12.

The horizontal portion of the bar 14 fits around the post 11 and has an angular portion which is formed complementarily to the notches 12 and which is adapted to removably engage any of the notches 12 to position the carriage 13 with respect to the post 11.

Mounted on the vertical portion of the bar 14 is a thumb piece 17. Extending horizontally from the upper end of the thumb piece 17 is a stud 18, which extends into an opening 19 in the side edge of the carriage 13.

A coil spring 21 concentrically surrounds the stud 18 and extends between the carriage 13 and the thumb piece 17. The coil spring 21 normally urges the bar 14 into a position in which it engages the notch 12 to lock the carriage 13 against longitudinal movement along the post 11. The thumb piece 17 must be pushed inwardly toward the post 11 to move the bar 14 out of the notch 12 before the carriage 13 can be moved to another notch 12. Re-engagement of the bar 14 with the notch 12 is automatic, upon release of manual pressure on the thumb piece 17, due to the operation of the spring 21.

A knob 22 is mounted above the thumb piece 17. The knob 22 is secured to the end of a shaft 23 which screw threadedly extends through the side edge of the carriage 13 to engage the center of an elongated vertically directed lock plate 20, which is disposed between the side edge of the carriage 13 and the post 11. When the knob 22 is tightened, the inner end of the shaft 23 exerts pressure upon the lock plate 20, urging it toward the side edge of the post 11. Portions of the lock plate 20 are cut away so that only its top, bottom and center portions engage the side edge of the post 11. This engagement locks the carriage 13 against longitudinal movement with respect to the post 11 and also takes up any play between the carriage 13 and the post 11. The knob 22 must, of course, be loosened before each movement of the carriage 13 and tightened thereafter.

The side of the carriage 13 adjacent to the notches 12 is provided with a pair of horizontally directed arms 24 and 25 at the top and bottom thereof. A vertically directed accurately ground shaft 26 of circular cross-section has its lower end mounted within an opening in the lower arm 25 and its upper end extending through an aligned opening in the upper arm 24. A set screw 27 extends through the end of the upper arm 24 to lock the shaft 26 in place.

A frame 30 is mounted for vertical movement along the shaft 26. The frame 30 includes upper and lower arms 31 and 32, which have circular openings which fit around the shaft 26. Extending between the arms 31 and 32 directly adjacent to the side of the carriage 13 is an elongated rack 29. Secured to the opposite side of the frame 30 is a measuring member 33, which has a vertical portion 34 extending vertically downwardly between the arms of a yoke 28, which comprises part of the carriage 13. The measuring member 33 also includes a horizontal portion 35, which extends laterally outwardly beneath the yoke 28 and which has a tapered end 36.

An arm 37 is secured at its outer end to the frame 30. The inner end of the arm 37 carries an enlargement 38, which fits beneath and engages the lower end of the operating stem 39 of a precision indicator gauge 40. Vertical displacement of the stem 39 of the guage 40 is indicated by a pair of dial indicators 41 and 42 on circular calibrated dials. The gauge 40 is mounted on the upper part of the carriage 13.

A pinion gear 43 is mounted adjacent the end of a horizontally directed shaft 44, the inner end of which journaled in an opening in the carriage 13. The opposite end of the shaft 44 extends through another opening in the carriage 13 and is connected to an arm 45, the opposite of which carries a pin 58. The arm 45 is mounted for rotation within a circular housing 46, which is secured to the side of carriage 13 opposite from the indicator gauge 40.

A circular control knob 47 concentrically surrounds the housing 46. The outside of the knob 47 is knurled for manual gripping and rotation. The knob 47 also carries adjacent its periphery a ball 48 for more rapid rotation of the knob 47. A set screw 49 secures the control knob 47 to a central solid shaft 50, so that rotation of the knob 47 rotates the shaft 50. The shaft 50 is provided with a circular race 51, within which are mounted a plurality of ball bearings 52.

A hollow cylindrical shaft 53 concentrically surrounds the solid shaft 50. The hollow shaft 53 is provided with a race 55 which engages the ball bearings 52, so that rotation of the solid shaft 50 is transmitted by the ball bearings 52 to the hollow shaft 53. A pressure plate 56 is urged inwardly by a spring 57, which is secured to the housing 46. The spring 57 exerts pressure against the ball bearings 52, to maintain them in driving frictional engagement with the shafts 50 and 53.

The inner end of the hollow shaft 53 is enlarged to provide a flange 60, which engages the pin 58 of the arm 45 to provide a loose coupling between the ball drive and the pinion gear 43 for vertical movement of the frame 30 with respect to the carriage 13.

The operation of the ball drive may be compared to that of a sun and planet gear drive, in that the ball bearings 52 act in the manner of planet gears, the solid driver shaft 50 acts as a sun gear, the hollow shaft 53, which acts as a ball cage, is the driven shaft and the stationary housing 46 is the ring gear. The spring loaded pressure plate 56 provides sufficient friction for the drive to operate without slipping.

When the control knob 47 is rotated in one direction, the shafts 50 and 53 are rotated so that the flange 60 engages the pin 58 to rotate the arm 45 and shaft 44. Rotation of the shaft 44 rotates the pinion gear 43, causing it to move upwardly along the rack 29 to move the frame 30 upwardly along the shaft 26, while the carriage 13 remains stationary.

When the control knob 47 is rotated in the opposite direction, the shafts 50 and 53 are rotated so that the flange 60 moves away from engagement with the pin 58. This leaves the frame 30 free to move downwardly by the force of gravity acting upon its own weight. The frame 30 moves downwardly only in response to the force of gravity and is not driven downwardly by the gears. The frame 30 will continue its downward movement until the pin 58 again engages the flange 60.

A pair of knurled knobs 61 are secured to shafts 62 which are screw threadedly mounted in the opposite sides of the yoke 28. The ends of the shafts 62 engage the sides of the vertical portion 34 of the measuring member 33, to prevent lateral movement of the measuring member 33 during conventional operation of the device.

An elongated scale 63 having a plurality of markings thereon, ordinarily at one inch intervals, is mounted within a shallow recess 64 in one side of the post 11. The carriage 13 has an opening 65 in its side through which the markings on the scale 63 are visible. The scale 63 is preferably removable, so that scales having different markings may be used, as desired. Thus, the markings may start at zero if the base 10 is on the same level as the object being measured. If there is a difference in their respective elevations, such difference may be compensated for by the markings on the rule 63, in order to provide a direct and correct reading of the true height of the object.

In operation of the device as a height gauge, the knob 22 is first released and the thumb piece 17 pushed inwardly to release the carriage 13 for sliding movement along the post 11 to a position wherein the lower edge of the horizontal portion 35 of the measuring member 33 is disposed less than one inch above the top of the object whose height is being measured. Upon release of the thumb piece 17, the bar 14 engages the notch 12, and the knob 22 is tightened to lock the carriage 13 with respect to the post 11.

It should be noted in this regard that it is comparatively easy to provide the post 11 with accurately spaced notches 12 at one inch or other suitable intervals. This is easier than accurately machining gears for long travel. It is also quicker to move the carriage 13 along the post 11 by sliding movement than it is to move it by gears or the like.

The control knob 47 is then rotated to release the frame 30 for downward movement along the shaft 26. As the frame 30 moves downwardly, it carries the arm 37 and enlargement 38 with it, permitting the operating stem 39 of the gauge 40 to move downwardly. As the operating stem 39 moves downwardly, the dial indicators 41 and 42 accurately indicate on their respective dials with the amount of vertical movement of the operating stem 39.

Downward movement of the frame 30 is continued until the lower edge of the horizontal portion 35 of the measuring member 33 rests upon the top of the object being measured. When this occurs, the frame 30 will stop moving downwardly, and the operating stem 39 and dial indicators 41 and 42 will stop with it. Continued rotation of the control knob 47 past this point is harmless and can be continued without adversely affecting the accuracy of the reading or the operation of the device. Although the operator will ordinarily stop rotating the knob 47 shortly after the dial indicators 41 and 42 stop moving, the knob 47 can be rotated an amount equivalent to more than half the movement of the frame 30 before the flange 60 makes a complete revolution and engages the opposite side of the pin 58, to prevent further rotation of the knob 47.

As soon as the frame 30 stops moving downwardly and the dial indicators 41 and 42 stop rotating, the height of the object being measured can be read directly from the device. The markings on the scale 63 are preferably coordinated with the measuring member 33, so that the number which is visible through the opening 65 accurately indicates the height of the lower edge of the horizontal portion 35 of the measuring member 33 when the frame 30 is in its lowermost position.

The reading of the dial indicator 42 preferably indicates tenths of an inch on a circular dial of 0–10, while the dial indicator 41 indicates thousandths of an inch on a circular dial of 0–100. A direct dial reading can accordingly be made which is accurate to a thousandth of an inch or less.

The correct height reading is accordingly obtained by merely combining the number of inches indicated on the number visible through the opening 65 with the fraction of an inch indicated by the dial indicators 41 and 42.

The conventional height gauge utilizes a test dial indicator, micrometer or other indicating means which utilizes a vernier scale. Such readings are difficult, time consuming and often erroneous or variable, due to variations in the visual acuity and care exercised by the operator. The direct dial readings of my device provide greater speed of reading combined with greater accuracy.

It will also be noted that my device provides greater speed of operation because the coarse setting is achieved by a rapid sliding movement of the carriage 13 along the post 11, and the fine setting is likewise achieved by moving the control knob 47 rapidly until the measuring member 33 engages the object and the frame 30 and dial indicators 41 and 42 stop moving. It is not necessary to rotate the control knob 47 slowly, since rotation of the control knob 47 past the point of contact with the object has no effect on the operation of the device or the accuracy of the reading.

This is in sharp contrast to the operation of a conventional height gauge, which must be used in combination with a test dial indicator attached to the measuring member because it is otherwise impossible for the operator to determine precisely when the measuring member is just resting upon the object being measured. There may be a slight but unobservable clearance between the measuring member and the object, or the measuring member may be pressing down too hard upon the object. Variations of this type necessarily result in incorrect readings, so that a machinist test dial indicator is required, if uniform accuracy is to be achieved.

A conventional machinist test dial indicator has a lightly spring loaded arm with a small tip which is used to engage the object and indicate the pressure of the engagement. If the object is larger in area than the tip, it is necessary to move the tip around until the highest (or lowest) point is located.

It is also always necessary for the operator to move the operating stem of the test dial indicator slowly and carefully into engagement with the object being measured. With my device, the pressure is uniform at all times because it is always the result of the force of gravity acting upon a constant mass. My height gauge is accordingly capable of being operated more quickly and more accurately than a conventional height gauge. It also requires far less training and less skill and care on the part of the operator.

Since the downward movement of the measuring member 33 is actually completely independent from the rack and pinion gear, there is no backlash, and gear accuracy is not required because the measuring member 33 is free from the gears when the reading is made.

Because of the automatically uniform downward pressure of the measuring member 33, it is possible to read the run-out or bow of a shaft by merely mounting the shaft on a pair of V blocks. The measuring member 33 is lowered into engagement with the shaft and direct readings can then be made of the variations on the dial indicators 41 and 42, since the loose coupling permits the measuring member 33 and frame 30 to move upwardly or downwardly in response to variations in the diameter of the shaft.

The device can be used as a depth gauge by attaching a removable elongated rod 70 of the desired length and contour to the horizontal portion 35 of the measuring member 33, as indicated in FIG. 7 of the drawings. The rod 70 is lowered into the opening to be measured until its bottom engages the bottom of the opening. The scale 63 can be changed accordingly, or the necessary calculations can easily be made, once the length of the rod 70 is known.

The device is also capable of use in locating the center of a circular opening and measuring its height (or depth) by merely mounting on the end of the horizontal portion 35 of the measuring member 33 a conical member 71, as indicated in FIG. 8 of the drawings. When the conical member 71 is used, the knobs 61 should both be released, so that the horizontal portion 34 of the measuring member 33 is free to move laterally to a slight degree, so that the conical member 71 will be accurately centered in the opening.

When the device is used with the conical member 71 or whenever the measuring member 33 should move both upwardly and downwardly, as in measuring the bow of a shaft mentioned above and other similar applications, the control knob 47 should first be rotated to move the measuring member 33 to a position slightly beneath the lowermost expected position. This frees the measuring member 33 for the necessary downward movement. The measuring member 33 is always free for upward movement, except when the frame 30 is at its uppermost position, because the rack and pinion are free to move without engaging the ball drive.

The dial 40 may be provided with a zeroing adjustment which can be used to compensate for slight variations such as the undersize or oversize of measuring blocks or surfaces, etc. This adjustment comprises a rotatably mounted dial face 73, which is normally held against movement by a lock knob 74. When the knob 74 is released by manual rotation thereof, the dial face 73 can be manually rotated to make whatever slight adjustment may be required and then locked again to hold the dial face 73 stationary.

The operating stem 39 of the gauge 40 is biased downwardly by spring means not shown in the drawings, so that the dial indicators 41 and 42 give a zero reading when the operating stem 39 is in its lowermost position. The spring bias of the operating stem 39 permits it to automatically follow the downward movement of the frame 30.

It should be understood that the device is capable of various modifications, revisions and changes. In particular, other suitable types of drive means may be used in place of the ball drive which has been shown and described. It is desirable that whatever drive means is used, its drive should operate positively in only one direction, so that the frame is driven upwardly but moves downwardly only by the force of gravity and not by operation of the drive means. It is also desirable that means should be provided for normally preventing downward movement of the frame until it has been released by rotation of the control knob in a direction opposite to its drive direction.

I claim:

1. In a height gauge, a vertically directed post, a carriage mounted for manual vertical sliding movement along said post, said post having a plurality of accurately spaced notches therein, means carried by said carriage for engaging any one of said notches, means for indicating the vertical position of said carriage with respect to said post, said carriage having a pair of horizontally directed arms, a vertically directed shaft extending between said arms, a frame mounted for vertical sliding movement along said shaft, a measuring member carried by said frame and adapted to engage an object being measured, said frame having a vertically directed elongated rack, a pinion gear carried by said carriage and engaging said rack, said pinion gear being mounted on a pinion gear shaft, said pinion gear shaft being connected through a ball drive to a manually rotatable control knob, said knob being rotatable in one direction to move said frame upwardly with respect to said carriage, said frame upon the rotation of said control knob in the opposite direction being released for downward movement with respect to said carriage by the force of gravity, a gauge mounted on said carriage, said gauge having indicator means, a vertically directed operating stem connected to said indicator means, and means carried by said frame for engaging said operating stem, so that said gauge indicates the vertical movement of said frame with respect to said carriage.

2. The structure described in claim 1, said means for engaging said notches comprising a horizontally directed bar, spring means normally urging said bar horizontally in one direction into engagement with one of said notches to hold said carriage against vertical movement with respect to said post, and means for manually moving said bar horizontally in the opposite direction against the urging of said spring to permit vertical movement of said carriage along said post.

3. The structure described in claim 1, and an elongated vertically directed lock plate carried by said carriage and disposed adjacent to the opposite side of said post from said notches, said lock plate being substantially equal in length to said carriage, a manually operable lock knob having a portion engaging said lock plate, said knob adapted upon tightening thereof to move said lock plate into fixed frictional engagement with said post, said knob adapted upon loosening thereof to release said lock plate from engagement with said post.

4. The structure described in claim 1, said control knob being mounted on a first shaft, a second shaft disposed adjacent to said first shaft, ball means engaging said first shaft and second shaft, so that rotation of said control knob rotates said second shaft, said ball means providing sufficient friction to normally prevent downward gravitational movement of said frame with respect to said carriage, rotatable engaging means between said second shaft and said pinion gear shaft, said engaging means acting to drive said pinion gear to move said frame upwardly when said control knob is rotated in one direction, said engaging means releasing said pinion gear to permit said frame to be moved downwardly by the force of gravity when said control knob is rotated in the other direction.

5. The structure described in claim 4, said second shaft concentrically surrounding said first shaft, means for holding said ball means in engagement with said first and second shafts, a rotatable arm attached to said pinion gear shaft, a transversely directed pin disposed at the end of said arm, said second shaft having a peripheral flange, said flange being adapted to engage said pin to drive said pinion gear shaft and pinion gear.

6. In a height gauge, a vertically directed shaft, a frame mounted for vertical sliding movement along said shaft, means carried by said frame for engaging an object to be measured, a gauge fixedly mounted with respect to said frame, said gauge having operating means, means carried by said frame for engaging the operating means of said gauge, so that said gauge indicates the vertical movement of said frame along said shaft, means for moving said frame along said shaft, including means for releasing said frame for free downward movement in response to the force of gravity alone acting on said frame, without said frame being urged downwardly by said moving means, so that said frame engages the object being measured with a limited and constant pressure resulting only from the weight of said frame.

7. In a height gauge, a vertically directed post, a carriage mounted for vertical sliding movement along said post, said post having a plurality of notches therein, means carried by said carriage for engaging any one of said notches, means for indicating the vertical position of said carriage with respect to said post, a frame mounted for vertical sliding movement on said carriage, a measuring member carried by said frame and adapted to engage an object being measured, said frame having a vertically directed rack, a pinion gear carried by said carriage and engaging said rack, drive means connecting said pinion gear to a control knob, said drive means being operable upon rotation of said control knob in one direction to move said frame upwardly, said drive means being operable upon rotation of said control knob in the opposite direction to release said frame for free downward movement in response to the force of gravity alone, without said frame being urged downwardly by said drive means, said drive means including drive disengaging means operable upon downward movement of said measuring member into contact with the object being measured to disengage said drive means from said frame and allow said frame and measuring member to remain stationary despite the continued rotation of said knob in said last named direction, so that said measuring member engages said object being measured with a limited and constant pressure resulting only from the weight of said frame, a gauge mounted on said carriage, and means carried by said frame for operating said gauge, so that said gauge indicates the vertical position of said frame with respect to said carriage.

8. In a height gauge, a vertically directed post, a carriage mounted for vertical sliding movement along said post, means for indicating the vertical position of said carriage with respect to said post, a frame mounted for vertical sliding movement on said carriage, a measuring member carried by said frame and adapted to engage an object being measured, drive means connecting said frame to a control knob, said drive means being operable upon rotation of said control knob in one direction to move said frame upwardly, said drive means being operable upon rotation of said control knob in the opposite direction to release said frame for free downward movement in response to the force of gravity alone, without said frame being urged downwardly by said drive means, said drive means including drive disengaging means operable upon downward movement of said measuring member into contact with the object being measured to disengage said drive means from said frame and allow said frame and measuring member to remain stationary despite the continued rotation of said knob in said last named direction, so that said measuring member engages said object being measured with a limited and constant pressure resulting only from the weight of said frame, and a gauge having means for indicating the vertical position of said frame with respect to said carriage.

9. In a height gauge, a frame mounted for vertical sliding movement, a measuring member carried by said frame and adapted to engage an object being measured, drive means connecting said frame to a control knob, said drive means being operable upon rotation of said control knob in one direction to move said frame upwardly, said drive means being operable upon rotation of said control knob in the opposite direction to release said frame for free downward movement in response to the force of gravity alone, said drive means including drive disengaging means operable upon downward movement of said frame into contact with the object being measured to disengage said drive means from said frame and allow said frame to remain stationary despite the continued rotation of said knob in said last named direction, so that said frame engages the object being measured with a limited and constant pressure resulting only from the weight of said frame, and means for indicating the vertical position of said frame.

10. The structure described in claim 9, said drive means connecting said frame to said control knob including a rack, a pinion gear engaging said rack, and a friction drive for driving said rack and pinion, said friction drive preventing downward movement of said frame except upon the rotation of said control knob.

11. The structure described in claim 9, said frame having a vertically directed rack, a pinion gear engaging said rack, ball drive means connected to said control knob, and rotatable means connecting said ball drive means to said pinion gear, whereby said control knob drives said pinion upon rotation in one direction and upon rotation in the other direction releases said pinion gear, to permit downward movement of said frame by the force of gravity.

12. The structure described in claim 9, and an attachment mounted on said measuring member, said attachment having a conical exterior surface adapted to engage the inner diameter of a circular opening, the longitudinal axis of said conical surface being aligned with the bottom edge of said measuring member, said attachment being free for limited vertical and horizontal movement, whereby when said attachment is moved into engagement with the inner diameter of a circular opening, the bottom edge of said measuring member is automatically aligned with the center of said opening, to locate and measure the height of the center of said opening.

13. In a height gauge, a vertically directed post, a carriage mounted for vertical sliding movement along said post, means engageable between said carriage and post for selectively holding said carriage at any one of a plurality of fixed positions along said post, a frame mounted for vertical sliding movement on said carriage, a measuring member carried by said frame and adapted to engage an object being measured, drive means connecting said frame to a control knob, said drive means being operable upon rotation of said control knob in one direction to move said frame upwardly, said drive means being operable upon rotation of said control knob in the opposite direction to release said frame for free downward movement in response to the force of gravity alone without said frame being urged downwardly by said drive means, said drive means including drive disengaging means operable upon downward movement of said measuring member into contact with the object being measured to disengage said drive means from said frame and allow said frame and measuring member to remain stationary despite the continued rotation of said knob in said last named direction, so that said measuring member engages said object being measured with a limited and constant pressure resulting only from the weight of said frame, and a gauge having means for indicating the vertical position of said frame with respect to said carriage.

References Cited by the Examiner

UNITED STATES PATENTS

| | | | |
|---|---|---|---|
| 1,692,243 | 11/1928 | Beckmann | 33—147 X |
| 1,713,194 | 5/1929 | Ross | 74—798 X |
| 2,429,923 | 10/1947 | Cavicchi | 33—172 |
| 2,611,968 | 9/1952 | Brown | 33—169 |
| 2,787,838 | 4/1957 | Tucker | 33—172 X |
| 2,932,899 | 4/1960 | Arzoian | 33—169 |
| 2,958,950 | 11/1960 | Coniors et al. | 33—169 |
| 3,115,708 | 12/1963 | Roy | 33—169 X |

FOREIGN PATENTS

| | | |
|---|---|---|
| 118,593 | 4/1919 | Great Britain. |
| 752,926 | 7/1956 | Great Britain. |
| 878,103 | 9/1961 | Great Britain. |
| 221,966 | 9/1942 | Switzerland. |

ISAAC LISANN, *Primary Examiner.*